United States Patent [19]

Coppola

[11] Patent Number: 5,555,998
[45] Date of Patent: Sep. 17, 1996

[54] GATE VALVE LID

[76] Inventor: Daniel D. Coppola, 2301 Carroll St., North Las Vegas, Nev. 89030

[21] Appl. No.: 192,975

[22] Filed: Feb. 8, 1994

[51] Int. Cl.[6] .............................. B65D 90/10; F16L 5/00
[52] U.S. Cl. ........................ 220/484; 220/200; 52/20; 137/371; 138/89
[58] Field of Search .................... 52/19, 20; 137/365, 137/367, 371; 220/284, 352, 353, 484, 200; 404/25; 138/89

[56] References Cited

U.S. PATENT DOCUMENTS

| | | | |
|---|---|---|---|
| 996,956 | 7/1911 | Walcott | 137/367 |
| 1,413,236 | 4/1922 | Owens | 137/371 |
| 2,025,839 | 12/1935 | Woods, Jr. | 404/25 |
| 2,931,383 | 4/1960 | Handley | 137/371 |
| 2,932,324 | 4/1960 | Fisher | 138/89 |
| 2,996,214 | 8/1961 | Kemble | 220/284 |
| 3,426,659 | 2/1969 | Clarke | 404/25 |
| 3,561,470 | 2/1971 | Hawle | 137/371 |
| 3,841,517 | 10/1974 | Lockwood | 220/353 |
| 4,230,234 | 10/1980 | Taylor | 220/484 |
| 4,621,939 | 11/1986 | Thomann | 137/371 |
| 4,716,875 | 1/1988 | Troncoso, Jr. | 138/89 |
| 4,747,453 | 5/1988 | Howard, Sr. | 220/284 |
| 4,971,149 | 11/1990 | Roberts | 137/371 |
| 5,062,735 | 11/1991 | Gaudin | 404/25 |
| 5,234,029 | 8/1993 | Thomas | 137/371 |
| 5,289,851 | 3/1994 | Jorgensen | 138/89 |
| 5,327,925 | 7/1994 | Ortel | 137/371 |

FOREIGN PATENT DOCUMENTS

| | | | |
|---|---|---|---|
| 0189428 | 11/1983 | Japan | 52/20 |
| 707570 | 4/1954 | United Kingdom | 138/89 |

Primary Examiner—David Scherbel
Assistant Examiner—Randall E. Chin
Attorney, Agent, or Firm—Quirk & Tratos

[57] ABSTRACT

An improved gate valve lid for covering an access tube of a service box assembly leading to a gate valve below street level. The lid has a vertical height which is greater than its diameter so that the lid may not be flipped out of the service box assembly. In one embodiment, the lid includes a two-part assembly having an upper portion which is sized to rest in a tapered upper section of the service box located near street level, and a lower portion which may be displaced laterally with respect to the upper portion to allow the lower portion to be centered within a lower section of the service box, which may be out of alignment with the upper section. In this embodiment, the lower adjustable portion of the gate valve lid is preferably a tubular element slidably located on a cross pin passing through holes located at the upper end of the element across a downwardly opening recess in the upper portion. In one embodiment, the lower portion of the lid is defined by a plurality of downwardly depending fingers.

7 Claims, 2 Drawing Sheets

GATE VALVE LID

FIELD OF THE INVENTION

The present invention relates generally to lids for access holes in streets and, more particularly, to an improved lid for an access hole for a gate valve.

BACKGROUND OF THE INVENTION

In order to avoid tearing up a street whenever the flow of water or other liquids or gases through large main lines needs to be adjusted, stopcocks, commonly known as gate valves, are placed at strategic intervals in the lines and tubular service boxes are positioned above the valves to provide access from the street level. A long rod typically having a forked tool end may be used to actuate the valve from the street through the service box. These boxes may be anywhere from three inches to twelve inches in diameter. In order to protect the valve and also passers-by, a lid is placed at the top opening of the service box. Typical lids are made of cast iron and simply dropped into the tapered upper opening of the service box.

There may be hundreds of such gate valves and associated service boxes distributed around particular city. In most cases, the lids are held within the service box openings by gravity, rather than with any retaining structure, in order to save installation and service labor costs due to the great numbers of valves. Moreover, there are several inherent problems with providing a locking structure to the lid, as will be described below.

Although it is preferred to simply drop the lid into the top end of the service box, the lids frequently are displaced by passing vehicles. In a common occurrence, the front tire of a large truck cants the lid within the service box, after which the rear tire completely flips the lid out of the service box opening. With the lid removed, the valve is exposed, creating a danger of the main line being damaged. Also, the lid may crack due to its cast iron construction, thus requiring a replacement. Even more troublesome is the potential hazard caused by the flying lid and exposed hole to pedestrians and motorists alike. These problems are generally common to lids of 12" diameter or less, the larger lids having sufficient weight to resist being flipped.

Due to the aforementioned problems, and in some instances, to prevent tampering, there have been numerous designs to retain the lid in place over the service box. One such locking structure simply provides a thread on the exterior rim of the lid which mates with a female thread on the interior of the top end of the service box. Typically, the lid requires approximately half a turn to tighten onto the service box. It has been found, however, that repeated vibration from passing vehicle tires causes the lid to eventually loosen and be susceptible to displacement.

In another locking structure, a central nut in the lid actuates one or more outwardly extending fingers underneath the lid which interfere with some type of rim or flange fixed in the service box. While this is a slightly more advanced design, the nut tends to come loose, nevertheless. Furthermore, the nuts used in these lids have been of a special type requiring a five-sided tool to actuate. These tools and nuts are more costly than conventional ones, which is a major consideration for such a low-tech application, making them unsuitable for many municipalities or districts looking for cost-saving options. Furthermore, a maintenance worker must be in possession of the five-sided tool in order to obtain access to the gate valve. If the tool is lost or misplaced, maintenance work may be delayed.

An arrangement for threadingly mounting a lid over a tubular extension from a valve is shown in U.S. Pat. No. 2,344,893, issued to Montgomery. Another quite complex locking arrangement for a similar application is shown in U.S. Pat. No. 4,461,597, issued to Laurin. These and other designs drawn to locking lids for service boxes are either less than reliable or too complex for the cost-sensitive application.

Another drawback with prior service box lid designs is the absence of structure to compensate for misalignment between an upper level of the service box depending from street level and a lower section of the service box, which is centered over the gate valve. In the construction of such water main gate valves, the lower section of the service box is embedded in the fill of the roadway prior to the upper section being installed. The upper section comprises a larger diameter tube which fits over the lower section, but may not be exactly aligned therewith.

One illustrative street service box is shown in U.S. Pat. No. 1,032,503, issued to Rapp, and includes a set screw G which may be used to adjust the height of an upper casting relative to a lower pipe extending down to the valve. The design has the disadvantage that the set screw G is not accessible once the service box is in place. Therefore, any subsequent misalignment which occurs after placement cannot be corrected.

Due to the drawbacks of prior designs, there is a need for an improved gate valve lid which is inexpensive, simple to install and reduces the chance of displacement.

SUMMARY OF THE INVENTION

The present invention provides an improved gate valve lid which overcomes the drawbacks of the prior art. In particular, the lid comprises a disk-shaped upper body portion, a tapered neck for snugly fitting within the upper mouth of conventional service boxes, and a tubular portion extending downwardly into the access tube which portion has a length such that the total length of the lid is greater than the diameter of the upper body portion. The downward extension acts as a retaining stem for the lid in cases where the lid is flipped upward relative to the service box by the wheel of a passing vehicle. Due to the fact that the total height of the gate valve lid is greater than the diameter of the mouth of the service box, the lid cannot lie transversely across the mouth of the service box. Therefore, if the lid is flipped upward, at least a portion of the extension remains within the tube, allowing the entire lid to fall downwardly into the original resting position in the service box.

In accordance with a further advantageous feature of the present invention, the downwardly extending section of the gate valve lid is coupled to the upper rigid portion of the valve in a manner to permit lateral adjustment of the downwardly extending section with respect to the vertical axis of the lid. Lateral adjustment of the extension allows the improved gate valve lid to be in dual alignment with the typical two-part service box assembly. As stated above, typical service box assemblies ordinarily comprise a lower section extending upward from the gate valve and concentric therewith, and an upper section flush with the street level. Normally the lower section extends upwardly generally coaxially within the upper section for some distance. The two sections are provided with a gap therebetween to compensate for misalignment of the central axis of the gate valve and the central axis of the mounting position of the upper section. In accordance with the present invention, the upper rigid portion of the gate valve lid fits concentrically within the upper section of the service box, while the lower extension may be adjusted laterally to fit within the lower section of the service box.

In a preferred embodiment, the downward extension of the gate valve lid comprise a tubular member having aligned throughholes at an upper end thereof through which a pin extends, the pin being mounted at each end to the rigid portion of the lid. The upper end of the tubular extension fits in a recess formed within the tapered neck of the lid, the cross pin extending through aligned throughholes in the tapered neck. The ends of the cross pin may be threaded to receive a nut on the exterior of the neck of the lid to fasten the cross pin in place. Preferably, the rigid portion of the lid includes a series of downwardly depending raised fillets between which indents are defined, the ends of the cross pin and fastening nut being disposed between the indents so as not to project outwardly beyond the raised fillets.

In a still yet another embodiment, the gate valve lid may be cast as a single piece without the misalignment adjustment feature. The downwardly depending extension may be a solid tubular member, or, alternatively, may be formed by a plurality of downwardly depending fingers, thus reducing the material cost and weight of the lid.

DESCRIPTION OF THE PREFERRED EMBODIMENTS

Figure 1:
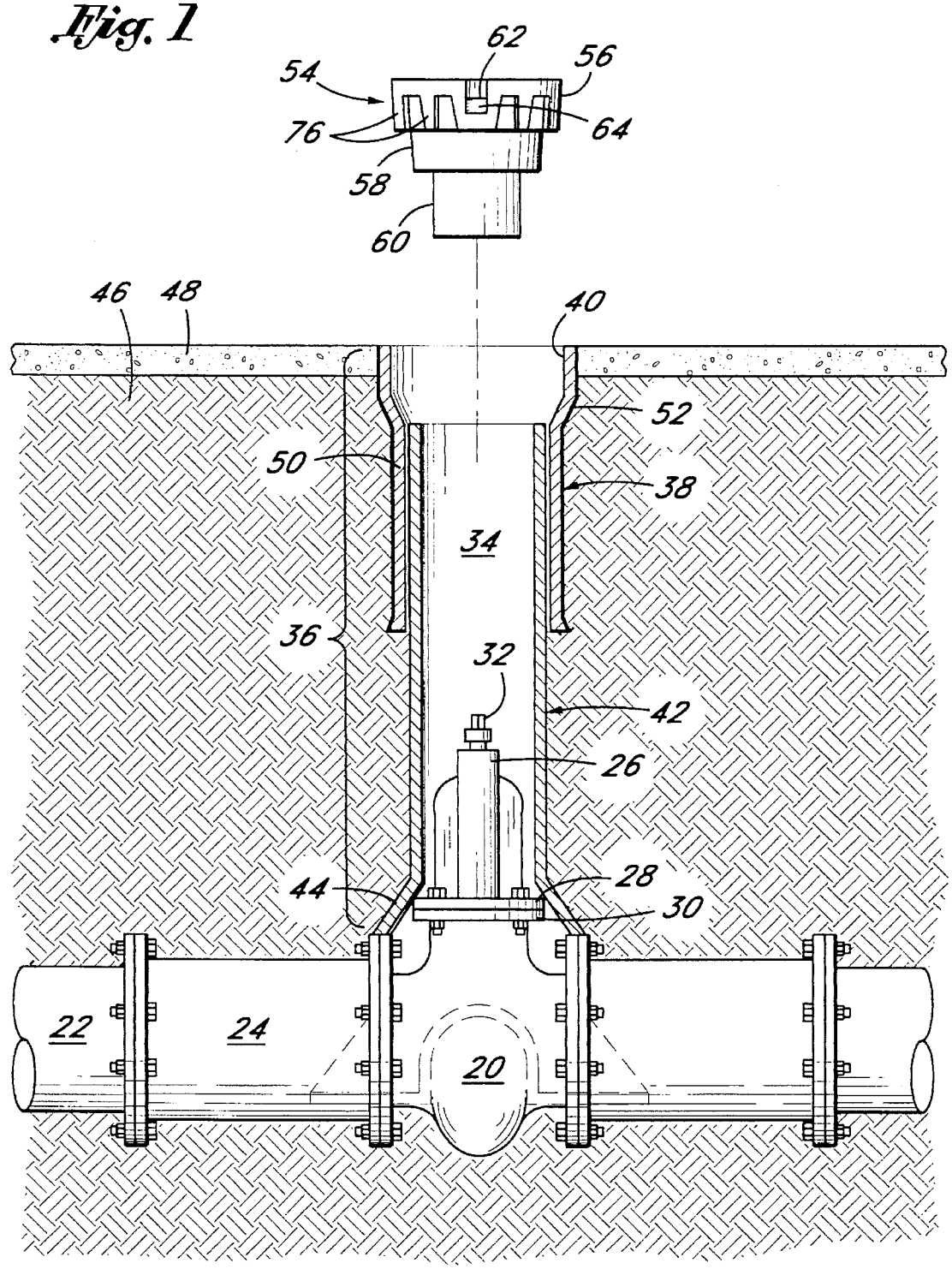
FIG. 1 is a partial vertical cross-sectional view of a gate valve and service box assembly with a lid shown removed.

Referring to FIG. 1, an assembly for gaining access to a water main valve 20 is shown. The valve 20 is normally buried in fill approximately five feet below the street surface 48 and is mounted in series with a water main 22 via one or more coupling members 24. A stopcock housing 26 includes a lower flange 28 which mounts to a flange 30 of the gate valve body 20. A stopcock 32 extends upwardly from the stopcock housing 26 into an access tube 34 of a service box assembly 36.

The service box assembly 36 generally comprises an upper section 38 having a mouth 40 coincident with the street surface 48, and a lower tubular section 42 extending from the gate valve body 20 upwardly into the upper section 38. In this respect, the upper section 38 is generally coaxial with the lower section 42 for some distance, and therefore has a slightly larger diameter to allow for some misalignment therebetween. The lower tubular section 42 includes a flared portion 44 which is positioned over the stopcock housing 26 so that the stopcock 32 is approximately centered within the lower section.

The upper section 38 of the service box assembly includes the aforementioned upper mouth 40 which transitions down to a narrow portion 50 at a tapered shoulder 52. A gate valve lid 54 preferably fits into the mouth 40 to cover the access tube 34.

Preferably, and in accordance with the present invention, the gate valve lid 54 comprises a cap 56 having a depending tapered neck 58 and a depending lower extension 60. The cap 56 has a diameter approximately equivalent to the inner diameter of the mouth 40 and thus comprises a substantially disk-shaped body 74, while the depending tapered neck 58 has a slightly smaller diameter to allow it to abut the tapered shoulder 52. In this manner, the exterior surface of the gate valve lid 54 contacts and is vertically positioned within the upper section 38. The lower extension 60 has a diameter allowing this section 60 to fit within the inner diameter of the upwardly extending lower section 42 of the service box assembly 36. The lower extension 60 preferably comprises a hollow tubular member, although the extension 60 may be a solid member as well.

Figure 2:
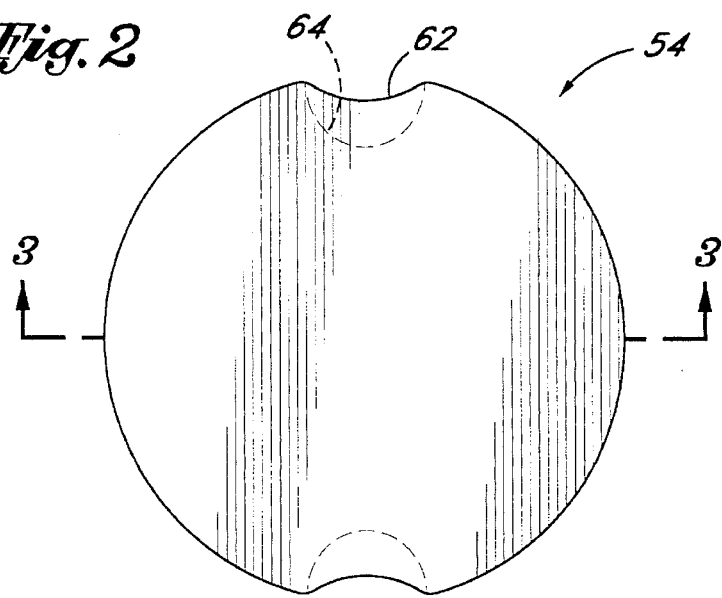
FIG. 2 is a top plan view of the gate valve lid of the present invention.
Figure 3:
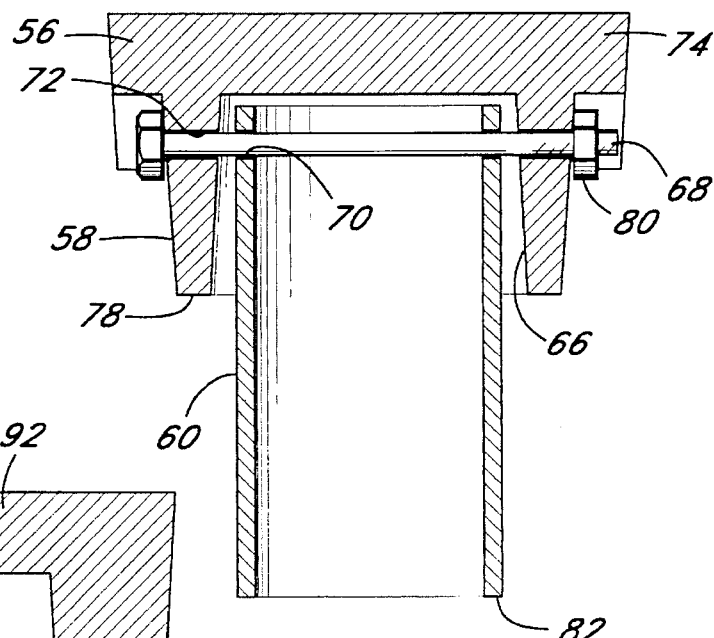
FIG. 3 is a cross-sectional view of the gate valve lid taken along line 3—3 of FIG. 2.

Now, with reference to FIGS. 2 and 3, the gate valve lid 54 of the present invention will be more fully described. The gate valve lid 54 includes a novel structure to allow the lower extension 60 to be aligned with the lower tubular section 42 of the service box assembly 36 while the cap 56 and tapered neck 58 are aligned with the upper section 38 of the service box assembly 36. As illustrated in FIG. 2, the gate valve lid 54 preferably includes two or more pry notches 62 in the upper peripheral rim, each notch 62 having undercuts 64 for receiving the finger of a maintenance worker or a tool for removing the lid.

Preferably, the cap 56 and tapered neck 58 are cast as a single body and define a slightly tapered downwardly opening recess 66. It should be clear that the neck 58 may comprise a separate set-back member, as illustrated in FIG. 3, or may merely comprise a portion of the cap 56 when a recess is cast into the bottom of the cap 56. The upper end of the extension 60 fits within the recess 66 and is retained therein by a cross pin 68. The cross pin 68 passes through aligned passages 70 in the walls of the extension 60 and aligned channels 72 bored through the walls of the gate valve lid 54. Pin 68 may be securely fastened to the lid 54 through use of a nut 80, as described in more detail below.

A series of circumferential raised fillets 76 (see FIG. 1) are preferably located on the exterior of the tapered neck 58 and cap 56 and depend downwardly from the disk-shaped body less than half the total distance between the disk-shaped body and a lower terminal lip 78 on the neck 58. The channels 72 for passage of the pin 68 through the tapered neck 58 preferably extend through the recessed areas between the raised fillets 76. Thus, when the cross pin 68 is fastened to the lid 54 by a means such as a nut 80, the nut or other attachment means are recessed between the raised fillets 76.

The coupling of the tubular extension 60 to the cap 56 allows the extension to be adjusted laterally along the cross pin 68 within the space provided by the recess 66. Preferably, the total lateral play between the extension 60 and recess 66 is approximately equivalent to the difference between the inner diameter of the upper section 38 and the outer diameter of the lower section 42 of the service box assembly 36. Thus, the lower extension 60 can faithfully align with any position of the lower tubular section 42 as located within the upper section 38. Furthermore, this misalignment may be at any particular angle around the generally vertical axis upward from the gate valve 20, the preferred gate valve lid 54 capable of being rotated to any desirable angle due to its uniformly shaped outer extremity. Thus, the lower extension 60 may be aligned at any angle around the vertical axis and positioned at any radial location along the cross pin 68.

A further advantage of the present invention is realized by ensuring that the lower extension 60 of the lid 54 meets at least a minimum length or "height" criteria. Specifically, the lower extension 60 is preferably sized to depend from the cap 56 so that the total length or height of the gate valve lid 54 is at least equal to or greater than the diameter or "width" of the disk-shaped body 74. More particularly, the distance between the upper surface of the disk-shaped body 74 and the lower rim 82 of the extension 60 must be at least as great as the diameter of the disk-shaped body. This size stipulation helps prevent the gate valve lid 54 from being flipped out of the service box assembly 36 by a passing vehicle. When the lid 54 has such a length, the gate valve lid 54 cannot lie horizontally within the mouth 40 of the tube 34, which has a diameter nearly equal to the disk-shaped body 74. If an impact from a passing vehicle tire causes the gate valve lid 54 to be displaced upwardly, the sides of the tubular extension 60 will contact the inner sides of the service box assembly 36 and prevent the lid from being completely flipped out. After contact between the extension 60 and the inner sides of the service box assembly 36, the lid 54 will simply fall back into place over the access tube 34.

Figure 4:
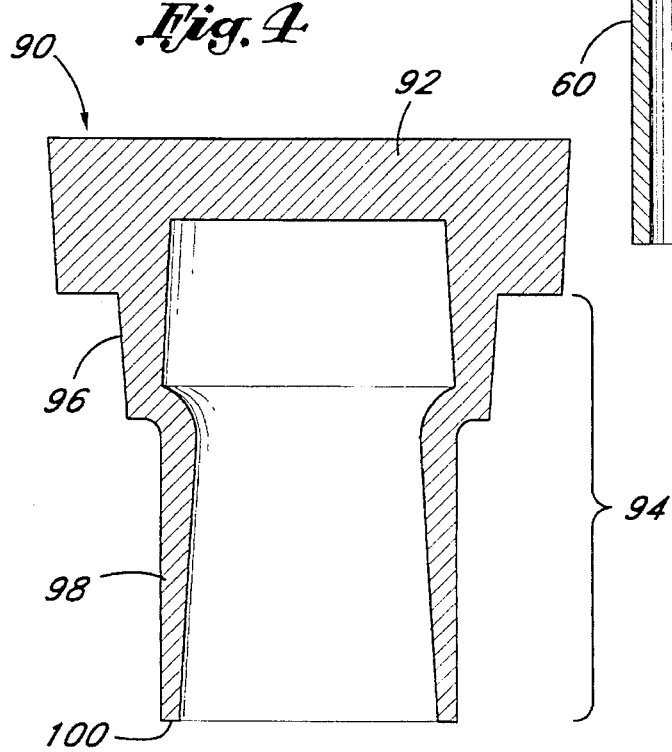
FIG. 4 is a vertical cross-sectional view of an alternative gate valve lid embodiment.

FIG. 4 shows a vertical cross-section through an alternative embodiment of a gate valve lid 90. This lid 90 comprises a disk-shaped body 92 and a downwardly depending service box coupling portion 94. The coupling portion 94 includes a tapered neck section 96 and a lower extension section 98. The tapered section 96 is similarly sized and shaped as the tapered neck 58 of the embodiment of FIGS. 1–3. Likewise, the extension section 98 has a similar outside diameter as the lower extension 60 of the first embodiment. In fact, the gate valve lid 90 is similar in many respects to the gate valve lid 54, except that it is fabricated as a single piece and does not include the misalignment adjustment of the cross pin 68 and separate lower extension 60. This gate valve lid 90 has a vertical height from the top edge of disk-shaped body 92 to the bottom rim 100 of the extension section 98 which is greater than the exterior diameter of the disk-shaped body. Thus, although the gate valve lid 90 is slightly less versatile, in that the extension section 98 cannot be centered within a badly misaligned lower section 42 of the service box assembly, the height of the lid is such that it cannot be flipped out of the service box assembly by a passing vehicle.

The gate valve lid 90 is preferably cast as a single piece of solid metal. In one embodiment, the extension section 98 is cast as a non-solid generally tubular section. In this respect, the extension section 98 may comprise a plurality of downwardly depending fingers at spaced intervals around the circumference of the tapered section 96. There may be as few as three fingers, but preferably, there are six or more fingers. This arrangement reduces the amount of cast metal required, and also reduces the weight of the lid 90.

In either embodiment, the lid 54, 90, or parts, thereof are preferably cast from cast iron, although other suitable materials well known in the art may be used.

Although this invention has been described in terms of certain preferred embodiments, other embodiments that are apparent to those of ordinary skill in the art are also within the range of this invention. Accordingly, the scope of the invention is intended to be defined only by reference to the following claims.

What is claimed is:

1. A gate valve lid for covering an access tube of a service box assembly, comprising:

an upper body configured to fit in the access tube;

a neck extending downwardly from said body, said neck comprising an outer wall having an inner recess;

a cross pin extending across said inner recess of said neck;

a lower extension having a sidewall, a first end and a second end, said first end connected to said neck, and said extension extending downward to said second end, said extension mounted on said pin and having an exterior dimension sized so that said extension may be displaced along the cross pin within said recess with respect to said neck.

2. The lid of claim 1, wherein said upper body has an exterior surface and includes a plurality of spaced raised fillets extending downward from the body on said exterior surface thereof, said fillets defining a plurality of indents, and wherein said cross pin is fixed with respect to said lid by means located within said indents.

3. An improved gate valve lid for placement over a mouth of a service box assembly, the service box assembly including an upper section and lower section, the lower section extending into the upper section, and wherein the lower section is centered over a gate valve, comprising:

a member having an upper portion having a substantially circular outer shape, a top end and a bottom end and a centerline running through said top and bottom ends, said upper portion of said member arranged to fit within the upper section of the service box assembly; and a lower portion having a substantially circular outer shape, a first end connected to said upper portion and a centerline running therethrough, said centerline of said lower portion displaceable radially with respect to the upper portion for location within the lower section of the service box assembly.

4. The improved gate valve lid of claim 3, including a cross-pin and wherein said upper portion of said member has an inner recess, said cross-pin mounted horizontally across said inner recess of said upper portion, and wherein said lower portion is mounted on said cross pin, and wherein said lower portion has an exterior dimension sized so that said lower portion may be displaced within said recess along the cross-pin.

5. The improved gate valve lid of claim 4, wherein said lid includes a plurality of circumferentially spaced raised fillets on said upper portion which define a plurality of indents and said cross pin is fixed with respect to said lid in an area defined by said indents.

6. A gate valve lid for placement within a service box assembly, said service box assembly including an upper section having a mouth, and a lower section, comprising:

a body having an outer surface for placement within the mouth of the upper section of the service box assembly;

an extension having an outer surface connected to said body for extension within the lower section of the service box assembly; and means for adjusting the relative radial position of said outer surface of said extension with respect to said body so that said extension may fit within said lower section of the service box while said body is located in the mouth of the upper section of the service box.

7. The gate lid of claim 6, wherein said lid further comprises a neck extending downwardly from said body, and said extension is connected to said neck.

* * * * *